United States Patent
Menge

(10) Patent No.: US 9,164,181 B2
(45) Date of Patent: Oct. 20, 2015

(54) SCINTILLATION CRYSTALS HAVING FEATURES ON A SIDE, RADIATION DETECTION APPARATUSES INCLUDING SUCH SCINTILLATION CRYSTALS, AND PROCESSES OF FORMING THE SAME

(71) Applicant: Peter R. Menge, Novelty, OH (US)

(72) Inventor: Peter R. Menge, Novelty, OH (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 209 days.

(21) Appl. No.: 13/716,107

(22) Filed: Dec. 15, 2012

(65) Prior Publication Data

US 2013/0240742 A1 Sep. 19, 2013

Related U.S. Application Data

(60) Provisional application No. 61/581,830, filed on Dec. 30, 2011.

(51) Int. Cl.
*G01T 1/20* (2006.01)
*G01T 1/202* (2006.01)
*G01V 5/04* (2006.01)

(52) U.S. Cl.
CPC .. *G01T 1/202* (2013.01); *G01V 5/04* (2013.01)

(58) Field of Classification Search
CPC .................................. G01T 1/202; G01V 5/04
USPC .......................... 250/367, 361 R, 368, 370.11
See application file for complete search history.

(56) References Cited

U.S. PATENT DOCUMENTS

| | | | |
|---|---|---|---|
| 3,878,373 A | * | 4/1975 | Blum ............................. 250/303 |
| 4,145,609 A | | 3/1979 | Takami et al. |
| 4,158,773 A | | 6/1979 | Novak |
| 4,234,792 A | * | 11/1980 | DeCou et al. ............ 250/370.09 |
| 4,365,155 A | | 12/1982 | Oi et al. |
| 4,764,677 A | | 8/1988 | Spurney |

(Continued)

FOREIGN PATENT DOCUMENTS

| | | |
|---|---|---|
| EP | 0831337 A1 | 3/1998 |
| JP | 2007-125086 A | 5/2007 |

(Continued)

OTHER PUBLICATIONS

Knapitsch et al., "Nuclear Instruments and Methods in Physics Research A," Elsevier, ScienceDirect, <www.elsevier.com/locate/nima>, 628, dated 2011, pp. 385-388.

(Continued)

*Primary Examiner* — David Porta
*Assistant Examiner* — Meenakshi Sahu
(74) *Attorney, Agent, or Firm* — Abel Law Group, LLP; Robert N Young

(57) ABSTRACT

A scintillation crystal capable of emitting scintillation light can have a main body and a feature extending from the main body along a side of the scintillation crystal. The feature can have a dimension that is no greater than 2.5 times a wavelength of the scintillating light. In an embodiment, the feature and the main body can have substantially the same composition, and in a further embodiment the scintillation crystal can be interface free between the feature and the main body. The feature can be formed along the side of the scintillation crystal by removing portions of the scintillation crystal. In particular, the feature can be formed by abrading a surface of the scintillation crystal with an abrasive material.

24 Claims, 4 Drawing Sheets

(56) References Cited

U.S. PATENT DOCUMENTS

| | | | |
|---|---|---|---|
| 4,831,263 A * | 5/1989 | Yamashita | 250/368 |
| 5,091,650 A * | 2/1992 | Uchida et al. | 250/366 |
| 5,208,460 A | 5/1993 | Rougeot et al. | |
| 5,519,227 A | 5/1996 | Karellas | |
| 5,723,865 A | 3/1998 | Trissel et al. | |
| 5,869,836 A | 2/1999 | Linden et al. | |
| 5,933,706 A | 8/1999 | James et al. | |
| 6,384,417 B1 * | 5/2002 | Okumura et al. | 250/367 |
| 6,504,156 B1 | 1/2003 | Takahara et al. | |
| 6,534,771 B1 | 3/2003 | Rozsa | |
| 6,898,265 B1 | 5/2005 | Mliner et al. | |
| 7,479,638 B2 | 1/2009 | Dorscheid et al. | |
| 7,692,156 B1 | 4/2010 | Nagarkar | |
| 7,723,687 B2 | 5/2010 | Nagarkar et al. | |
| 2004/0061058 A1 | 4/2004 | Williams | |
| 2004/0178346 A1 | 9/2004 | Williams et al. | |
| 2004/0232343 A1 | 11/2004 | Schmand et al. | |
| 2005/0104002 A1 | 5/2005 | Shah | |
| 2007/0051896 A1 | 3/2007 | Okada et al. | |
| 2007/0098029 A1 | 5/2007 | LeBoeuf et al. | |
| 2007/0098138 A1 | 5/2007 | Bessho | |
| 2007/0221855 A1 * | 9/2007 | Joung | 250/368 |
| 2007/0237668 A1 | 10/2007 | Martins Loureiro et al. | |
| 2008/0044075 A1 | 2/2008 | Gautier et al. | |
| 2008/0277588 A1 * | 11/2008 | Zeitler et al. | 250/370.11 |
| 2009/0294683 A1 | 12/2009 | Perna | |
| 2009/0296084 A1 | 12/2009 | Odom | |
| 2010/0044571 A1 | 2/2010 | Miyaoka et al. | |
| 2010/0127180 A1 | 5/2010 | Lifshitz et al. | |
| 2011/0108733 A1 | 5/2011 | Menge | |

FOREIGN PATENT DOCUMENTS

| | | |
|---|---|---|
| WO | 2006113933 A2 | 10/2006 |
| WO | 2010078170 A2 | 7/2010 |
| WO | 2013101515 A1 | 7/2013 |

OTHER PUBLICATIONS

Kronberger et al., "Improving Light Extraction from Heavy Inroganic Scintillators by Photonic Crystals," IEEE Nuclear Science Symposium Conference Records, M06-179, dated 2008, 5 pages.

Kronberger et al., "Probing the Concepts of Photonic Crystals on Scintillating Materials," IEEE Transactions on Nuclear Science, vol. 55, No. 3, dated Jun. 2008, 5 pages.

van Loef et al. High Energy-Resolution Scintillator: Ce3+ activated LaBr3, Applied Physics Letters vol. 79, No. 10 (Sep. 2001), pp. 1573-1575.

Arbab et al., "Application of Wavelet Transforms in Terahertz Spectroscopy of Rough Surface Targets", Proceedings of SPIE vol. 7601 (Mar. 2010), 760106, 7 pages.

Bircher et al., "Investigation of Crystal Surface Finish and Geometry on Single LYSO Scintillator Detector Performance for Depth-of-Interaction Measurement with Silicon Photomultipliers", Nuclear Instruments and Methods in Physics Research A vol. 693 (Jul. 2012), pp. 236-243.

International Search Report for PCT/US2012/070030 dated Apr. 16, 2013, 4 pgs.

K.O. Findley, et. al, "Fracture and Deformation Behavior of Common and Novel Scintillating Single Crystals," Proceedings of SPIE vol. 6707 (Sep. 2007), pp. 670706-1 to 670706-12.

Burr et al. Evaluation of a protype small-animal PET detector with depth-of-interaction encoding, IEEE Transactions on Nuclear Science, vol. 51, No. 4 (Aug. 2004), pp. 1791-1798.

Chavanelle, J. et al. "Scintillator Crystal Optimization by Monte Carlo Simulation Forphotodiode Matrix Detector," Nuclear Science Symposium Conference Record, 2000 IEEE, vol. 3, pp. 20/16-20/19, 2000. Abstract Only.

Ishibashi, H., et al., "Effect of Surface Roughness and Crystal Shape on Performance of Bismuth Germanate Scintillators," Japanese Journal of Applied Physics, vol. 25, Issue 9, pp. 1435, 1986. Abstract Only.

Bondar, V. G., et al., "GSO: Ce3+ Scintillator with a High Energy Resolution," Physicas, Quantum Electronics & Optoelectronics, vol. 4, No. 2, pp. 131-133, 2001.

International Search Report for PCT/US2009/069294 dated Jul. 16, 2010, 5 pgs.

U.S. Appl. No. 12/645,274, filed Dec. 22, 2009, Inventors: Peter R. Menge, et al.

Non-Final Office Action concerning U.S. Appl. No. 12/645,274 mailed Feb. 11, 2013, 14 pages.

Final Office Action concerning U.S. Appl. No. 12/645,274 mailed May 31, 2013, 15 pages.

* cited by examiner

SCINTILLATION CRYSTALS HAVING FEATURES ON A SIDE, RADIATION DETECTION APPARATUSES INCLUDING SUCH SCINTILLATION CRYSTALS, AND PROCESSES OF FORMING THE SAME

CROSS-REFERENCE TO RELATED APPLICATION

This application claims priority under 35 U.S.C. §119(e) to U.S. patent application Ser. No. 61/581,830 entitled "Scintillation Crystals Having Features on a Side, Radiation Detection Apparatuses Including Such Scintillation Crystals, and Processes of Forming The Same," by Menge, filed Dec. 30, 2011, which is assigned to the current assignee hereof and incorporated herein by reference in its entirety.

FIELD OF THE DISCLOSURE

The present disclosure is directed to scintillation crystals having features on a side, apparatuses including the scintillation crystals, such as radiation detection apparatuses, and processes of forming the same.

BACKGROUND

Scintillation crystals can be used for medical imaging and for well logging in the oil and gas industry as well as for environmental monitoring, security applications, and for nuclear physics analysis and applications. In particular, scintillation crystals can emit photons when exposed to certain forms of radiation. The photons can pass to a detector that converts detected photons into electrical pulses that can then be transmitted to analyzing equipment. Further improvement of radiation detection apparatuses is desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or other features that are inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the embodiments of the disclosure. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this disclosure belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 1:
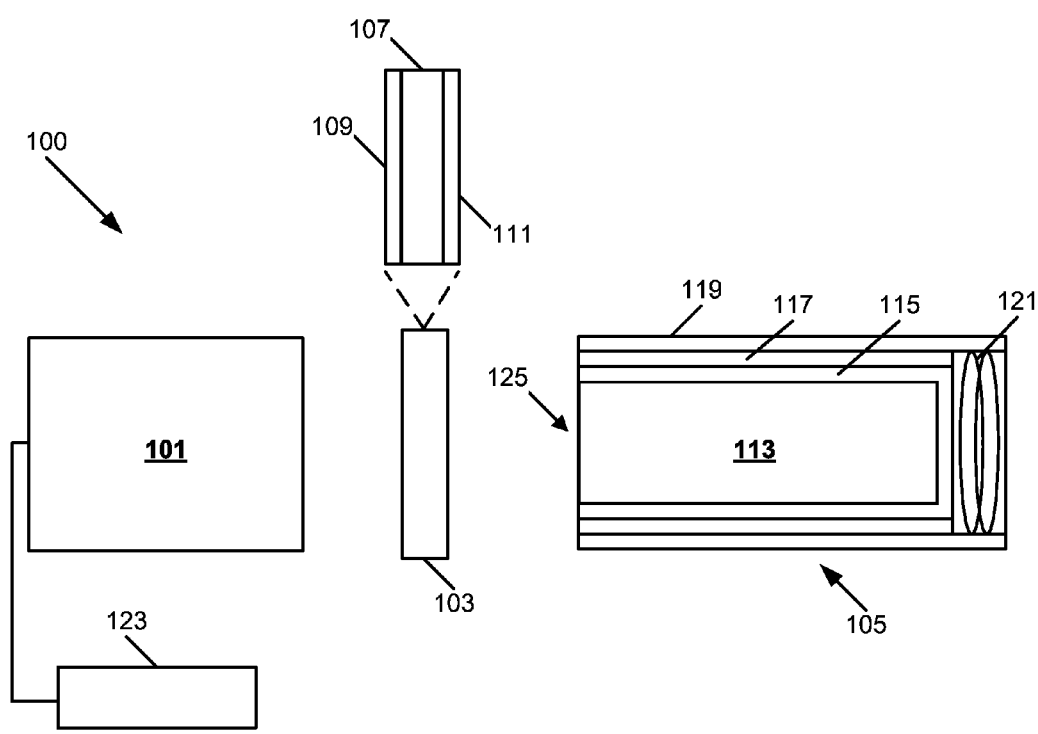
FIG. 1 includes an illustration of a radiation detection apparatus in accordance with a particular embodiment.

FIG. 1 includes an illustration of a radiation detection apparatus 100 in accordance with a particular embodiment. The radiation detection apparatus 100 can include a medical imaging apparatus, a well logging apparatus, or a security inspection apparatus. In an embodiment, the radiation detection apparatus 100 can include or be a component of a Computed Tomography ("CT") apparatus, a Single Positron Emission Computer Tomography ("SPECT") apparatus, or a Positron Emission Tomography ("PET") apparatus, such as a time-of-flight PET apparatus.

The radiation detection apparatus 100 can include a photosensor 101, an optical interface 103, and a scintillation device 105. The photosensor 101 can be a photodiode, a photomultiplier tube ("PMT"), a silicon photomultiplier tube ("SiPM"), an avalanche photodiode ("APD"), or a hybrid PMT that includes a photocathode and an electron sensor. In an embodiment, the optical interface 103 can comprise an optical coupling material, such as an organic polymer or another suitable optical coupling material. For example, the optical interface 103 can include a silicone rubber, an epoxy, a plastic, or any combination thereof. In another embodiment, the optical interface 103 includes a window 107 disposed between the photosensor 101 and the scintillation device 105. The window 107 can be optically coupled to the photosensor 101 and the scintillation device 105 via a first layer 109 of optical coupling material and a second layer 111 of optical coupling material. In an embodiment, the window 107 includes quartz, sapphire, or an aluminum oxynitride, such as Raytran®. Although the photosensor 101, the optical interface 103, and the scintillation device 105 are illustrated separate from each other, the photosensor 101 and the scintillation device 105 can each be adapted to be coupled to the optical interface 103, with the optical interface 103 disposed between the photosensor 101 and the scintillation device 105. In other embodiments, the optical interface 103 may not include the window 107 and may include one or more layers of optical coupling material, such as the first layer 109, the second layer 111, or both. Additionally, the optical interface 103 can include the window 107 and not include the first layer 109, the second layer 111, or both the first layer 109 and the second layer 111.

The scintillation device 105 includes a scintillation crystal 113 substantially surrounded by a reflector 115. In an embodiment, the scintillation crystal 113 can include NaI (Tl), CsI(Tl or Na), LaBr$_3$(Ce), CeBr$_3$, SrI$_2$(Eu), LuSiO$_5$(Y and/or Ce), Cs$_2$LiYCl$_6$(Ce), or those scintillators in the following classes: alkali halide scintillators, alkaline halide scintillators, lanthanide halide scintillators, or elpasolite scintillators. In addition, the reflector 115 can include a metal foil, polytetrafluoroethylene (PTFE) or another suitable material capable of reflecting light emitted by the scintillation crystal 113. The reflector 115 is substantially surrounded by a shock absorbing member 117. The scintillation crystal 113, the reflector 115, and the shock absorbing member 117 are housed within a casing 119. The casing 119 can include a stabilization mechanism 121, such as a spring, an elastomer, another suitable stabilization mechanism, or any combination thereof, interfaced to an end of the scintillation crystal 113 that is distal from the photosensor 101. The stabilization mechanism 121 can be adapted to apply lateral forces, horizontal forces, or any combination thereof, to the scintillation crystal 113 to stabilize a position of the scintillation crystal 113 relative to one or more other features of the radiation detection apparatus 100. In an embodiment, the radiation detection apparatus 100 can include more components or fewer components than those shown in FIG. 1. For example, radiation detection apparatus 100 may not include the stabilization mechanism 121 or the radiation detection apparatus 100 can include multiple stabilization mechanisms 121, such as multiple springs. In another example, the scintillation crystal 113 may be partially surrounded by the reflector 115.

The photosensor 101 can receive photons of scintillating light emitted by the scintillation crystal 113 when the scintillation crystal 113 is exposed to one or more forms of radiation. When the photosensor 101 receives photons from the scintillation device 105, the photosensor 101 can produce electrical pulses based on numbers of photons received from the scintillation device 105. The photosensor 101 may provide the electrical pulses to electronics 123 that are electrically coupled to the photosensor 101. The electrical pulses can be shaped, digitized, analyzed, or any combination thereof, by the electronics 123 to provide a count of the photons received at the photosensor 101 or other information. The electronics 123 can include an amplifier, a pre-amplifier, a discriminator, an analog-to-digital signal converter, a photon counter, another electronic component, or any combination thereof. The photosensor 101 can be housed within a tube or housing made of a material capable of protecting the photosensor 101, the electronics 123, or a combination thereof, such as a metal, a metal alloy, other material, or any combination thereof.

In an illustrative embodiment, photons can exit a side 125 of the scintillation crystal 113 that is adjacent to the optical interface 103. Features (not illustrated in FIG. 1 and described in more detail later in this specification) can be disposed along the side 125 of the scintillation crystal 113. The features can extend from a main body of the scintillation crystal 113. Additionally, trenches can separate the features disposed along the side 125. The features and the main body of the scintillation crystal 113 can have substantially the same composition, and the scintillation crystal 113 can be substantially interface free between the features and the main body. In an embodiment, the features can be formed by removing portions of the scintillation crystal 113. In a particular embodiment, the portions of the scintillation crystal 113 can be removed via a lapping process, a lithographic process, a wet etching process, an ion beam, an electron beam, or a liquid jet. In a further embodiment, the portions of the scintillation crystal 113 can by removed before placing the scintillation crystal 113 in the scintillation device 105.

In an embodiment, the features disposed along the side 125 of the scintillation crystal 113 can have a dimension that is no greater than approximately 2.5 times a wavelength of the scintillating light of the scintillation crystal 113. In a particular embodiment, the wavelength of the scintillation light of the scintillation crystal 113 can be a peak wavelength of a spectrum of wavelengths of the scintillating light. A peak wavelength of the spectrum of wavelengths of the scintillating light as used herein refers to a wavelength corresponding to an emission maximum of the scintillating light. In another embodiment, the wavelength of the scintillating light of the scintillation crystal 113 can be another wavelength of the spectrum of wavelengths of the scintillation light that is within a range of wavelengths of the peak wavelength of the spectrum. For example, the wavelength of the scintillation light can be a wavelength within approximately 47% of a wavelength corresponding to an emission maximum of the spectrum, within approximately 39% of the wavelength corresponding to the emission maximum of the spectrum, or within approximately 26% of the wavelength corresponding to the emission maximum of the spectrum. In situations where the spectrum of wavelengths of the scintillating light includes multiple peaks, the wavelength of the scintillating light can refer to any of the peak wavelengths of the scintillating light. In a particular embodiment, the dimension can include length, width, height, or radius. In an additional embodiment, one or more dimensions of the features can be no greater than approximately 2.5 times a wavelength of the scintillating light of the scintillation crystal 113. The wavelength of the scintillating light of the scintillation crystal 113 can be in a range of approximately 250 nm to approximately 600 nm.

In an embodiment, optical coupling material of the optical interface 103 can directly contact features formed along the side 125. In a particular embodiment, substantially all exposed surfaces of the features can be in direct contact with the optical coupling material of the optical interface 103. For example, the tops and sides of the features can be in direct contact with the optical coupling material. In an illustrative embodiment, the tops of the features can lie along substantially the same plane. Additionally, the optical coupling material of the optical interface 103 can directly contact the main body of the scintillation crystal 113. To illustrate, the optical coupling material can be disposed in trenches separating features formed along the side 125. In a further embodiment, the optical coupling material of the optical interface 103 can be substantially void free between the photosensor 101 and the scintillation crystal 113.

In an embodiment, the scintillation crystal 113 can have an index of refraction, and the optical interface 103 can have one or more indexes of refraction that are different from the index of refraction of the scintillation crystal 113. For example, the window 107, the first layer 109 of the optical coupling material, the second layer 111 of the optical coupling material, or any combination thereof, can have an index of refraction that is different from the index of refraction of the scintillation crystal 113. In a particular embodiment, one or more of the indexes of refraction of the optical interface 103 can have a lower index of refraction than the index of refraction of the scintillation crystal 113. Due to differences in the indexes of refraction between the scintillation crystal 113 and the optical interface 103, photons exit the scintillation crystal 113 when the photons impact the side 125 at an angle that is less than the critical angle. As used in this specification, the critical angle is defined as the angle of incidence above which total internal reflection occurs. The angle of incidence is measured with respect to a vector perpendicular to the macroscopic boundary between the scintillation crystal 113 and the optical interface 103. As used in this specification, photons exiting the scintillation crystal 113 when the angle of incidence of the photons is less than the critical angle are referred to as exiting the scintillation crystal 113 via transmission.

When features are disposed on the side 125 of the scintillation crystal 113, photons may also exit the scintillation crystal 113 via diffraction. Accordingly, in an embodiment, a first portion of the photons produced by the scintillation crystal 113 can exit the scintillation crystal 113 via transmission and a second portion of the photons produced by the scintillation crystal 113 can exit the scintillation crystal 113 via diffraction. Photons can exit the scintillation crystal 113 at a faster rate when the photons exit via transmission and diffraction as compared to a scintillation crystal having a substantially flat surface with no features. When photons exit the scintillation crystal 113 at a faster rate, the radiation detection apparatus 100 can allow faster detection of radiation, potentially with a higher signal-to-noise ratio. Additionally, when photons exit the scintillation crystal 113 at a faster rate, data from the radiation detection apparatus 100 can be used to produce images that are brighter and have improved energy resolution when compared with images produced using a scintillation crystal having a substantially flat surface with no features where photons exit via transmission only.

Further, a total number of photons exiting the scintillation crystal 113 can increase when photons exit the scintillation crystal 113 via transmission and diffraction. In an embodiment, in the absence of a reflector, such as the reflector 115, at least approximately 22% of the photons of the scintillating light exit the scintillation crystal 113, at least approximately 36% of the photons of the scintillating light exit the scintillation crystal 113, or at least approximately 49% of the photons of the scintillating light exit the scintillation crystal 113. In another embodiment, in the absence of a reflector, no greater than approximately 45% of the photons of the scintillating light exit the scintillation crystal 113, no greater than approximately 41% of the photons of the scintillating light exit the scintillation crystal 113, or no greater than approximately 38% of the photons of the scintillating light exit the scintillation crystal 113. With a conventional scintillation crystal in the absence of a reflector, no greater than 20% of the photons of the scintillating light exit the scintillation crystal. Also, when the reflector 115 is adjacent to one or more additional sides of the scintillation crystal 113, no greater than approximately 92% of the photons of the scintillating light exit the scintillation crystal 113, no greater than approximately 93% of the photons of the scintillating light exit the scintillation crystal 113, or no greater than approximately 94% of the photons of the scintillating light exit the scintillation crystal 113. With a conventional scintillation crystal surrounded by a reflector, no greater than 90% of the photons of the scintillating light exit the scintillation crystal.

Although, the scintillation crystal 113 having features disposed along the side 125 is described in the context of the radiation detection apparatus 100 of FIG. 1, the scintillation crystal 113 can also be used in apparatuses employed in other applications, such as a laser device or an optical data storage device.

Figure 2:
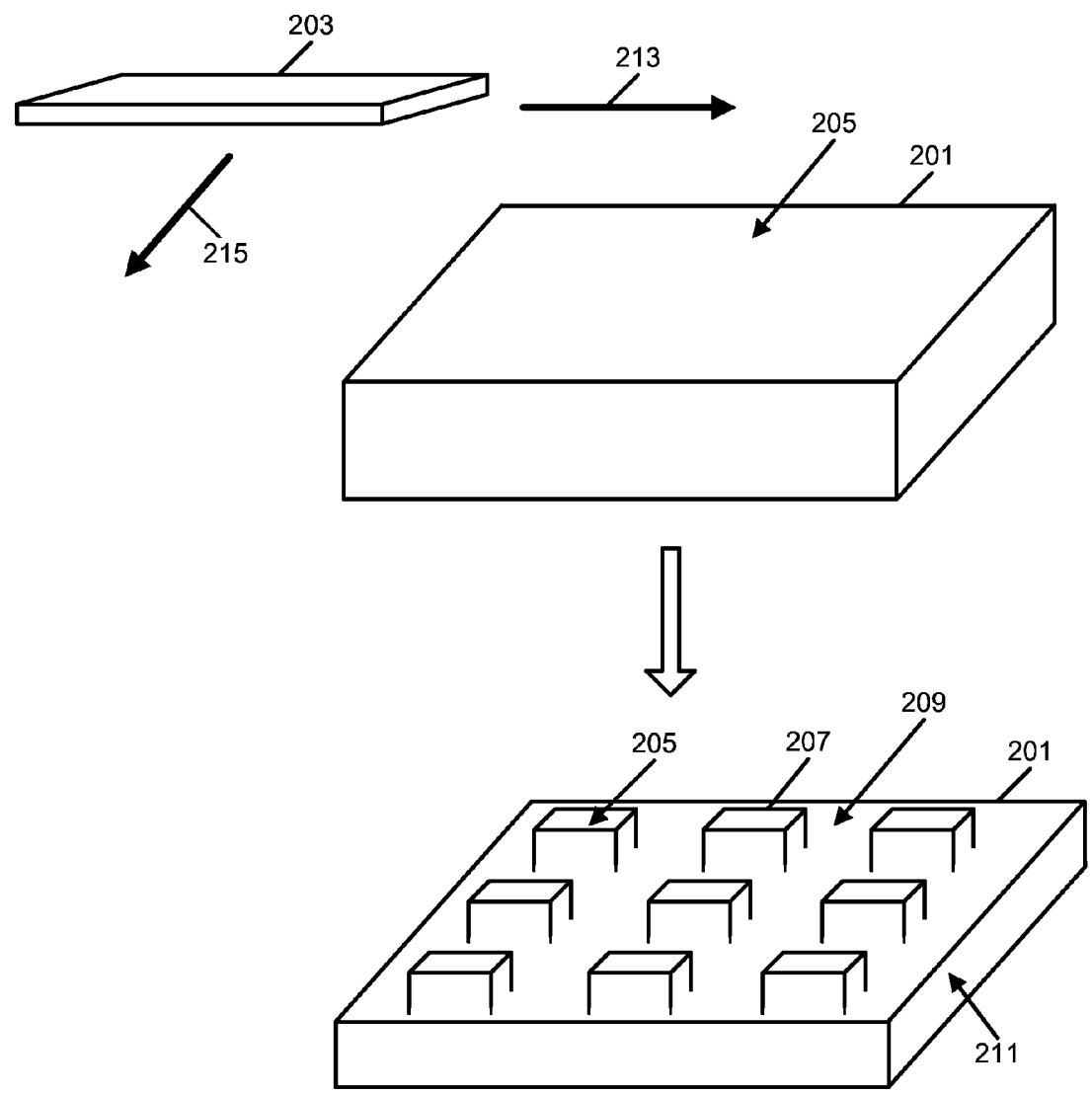
FIG. 2 includes an illustration of a process to produce a scintillation crystal having features formed along a side in accordance with a particular embodiment.

FIG. 2 includes an illustration of a process to produce a scintillation crystal 201 having one or more features formed along a side in accordance with a particular embodiment. Forming the one or more features along the side of the scintillation crystal can improve the rate photons exit the scintillation crystal 201, the number of photons exiting the scintillation crystal 201, or both, by allowing photons to exit from the scintillation crystal 201 via both transmission and diffraction. The scintillation crystal 201 may be the same as the scintillation crystal 113 of FIG. 1 or the scintillation crystal 201 may be different from the scintillation crystal 113.

In the illustrative embodiment of FIG. 2, the process includes providing the scintillation crystal 201 and an abrasive material 203. The abrasive material 203 can include diamond particles, alumina particles, silicon carbide particles, another suitable material harder than the scintillation crystal 201, or any combination thereof. In a particular embodiment, the abrasive material 203 may include particles having dimensions no greater than approximately 1500 nm, no greater than approximately 1200 nm, no greater than approximately 900 nm, no greater than approximately 700 nm, or no greater than approximately 500 nm. In another particular embodiment, the abrasive material 203 can include particles having dimensions no less than approximately 110 nm, no less than approximately 200 nm, or no less than approximately 250 nm. In an additional embodiment, the particles of the abrasive material 203 can be arranged in a regular pattern, such as a grid. In another embodiment, the particles of the abrasive material 203 can be arranged in an irregular pattern.

The process 200 also includes abrading at least one surface of the scintillation crystal 201 with the abrasive material 203, such as surface 205. Although FIG. 2 indicates that the abrasive material 203 is applied to a top surface 205 of the scintillation crystal 201, the abrasive material 203 can be applied to any surface of the scintillation crystal 201. The abrasive material 203 can be applied to the surface of the scintillation crystal 201 by hand, by machine, or both. In a particular embodiment, the abrasive material 203 can be applied to the surface of the scintillation crystal 201 by a lapping process. In an embodiment, the scintillation crystal 201 can be pixelated, and the abrasive material 203 can be applied to the surface 205 before or after pixelation of the scintillation crystal 201.

Abrading the surface 205 with the abrasive material 203 can produce features disposed along a side of the scintillation crystal 201, such as features 207. In the illustrative embodiment of FIG. 2, the features 207 are formed such that a top side of the features 207 is formed by the surface 205 of the scintillation crystal 201 and trenches 209 are formed between the features 207. The surface of the trenches 209 can be formed by a main body 211 of the scintillation crystal 201. In an embodiment, the features 207 and the main body 211 are monolithic and have substantially the same composition. Additionally, there are substantially no interfaces between the features 207 and the main body 211.

In an embodiment, the scintillation crystal 201 can be abraded with a single application of the abrasive material 203 to the surface 205 in a particular direction, such as first direction 213. The process 200 can also include a single application of the abrasive material 203 in a direction different from the first direction 213. For example, the process can include applying the abrasive material 203 to the surface 205 in the first direction 213 and applying the abrasive material 203 to the surface 205 in a second direction 215. In a particular embodiment, the second direction 215 can be orthogonal to the first direction 213. In another embodiment, the process can include multiple applications of the abrasive material 203 to the surface 205 in different directions. To illustrate, the process can include applying the abrasive material 203 to the surface 205 of the scintillation crystal 201 in a first direction, applying the abrasive material 203 to the surface 205 in a second direction that is offset by approximately 60° from the first direction, and applying the abrasive material 203 to the surface 205 in a third direction that is offset by approximately 60° from the second direction. In this way, the process can produce features having a triangular shape that are disposed on the surface 205 of the scintillation crystal 201.

In an embodiment, the scintillation crystal 201 can be cleaved before applying the abrasive material 203 to the surface 205. In a particular embodiment, the scintillation crystal 201 can be cleaved along a cleavage plane of the scintillation crystal 201. The cleaved surface of the scintillation crystal 201 can be substantially planar. In an illustrative embodiment, the surface 205 can be a cleaved surface of the scintillation crystal 201. Accordingly, the top surface of the features 207 can be disposed substantially along the cleavage plane of the scintillation crystal 201.

Figure 3:
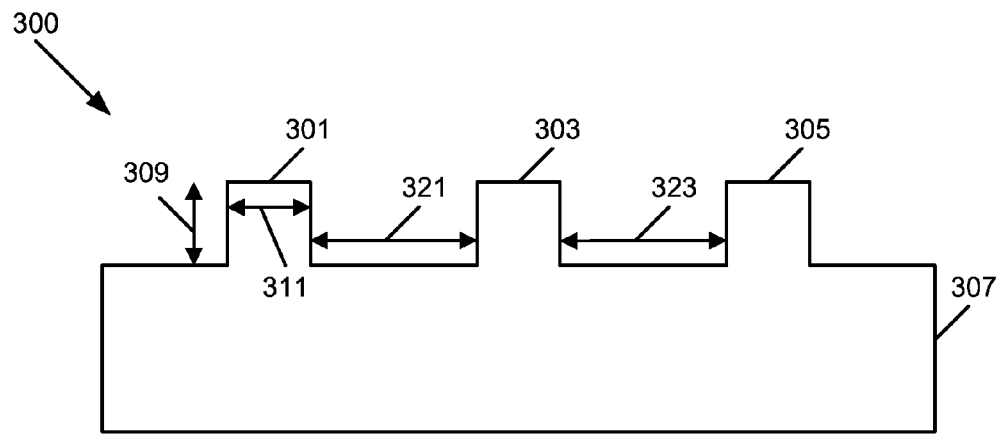
FIGS. 3, 4, and 5 include illustrations of a cross-sectional view of a scintillation crystal in accordance with particular embodiments.
Figure 4:
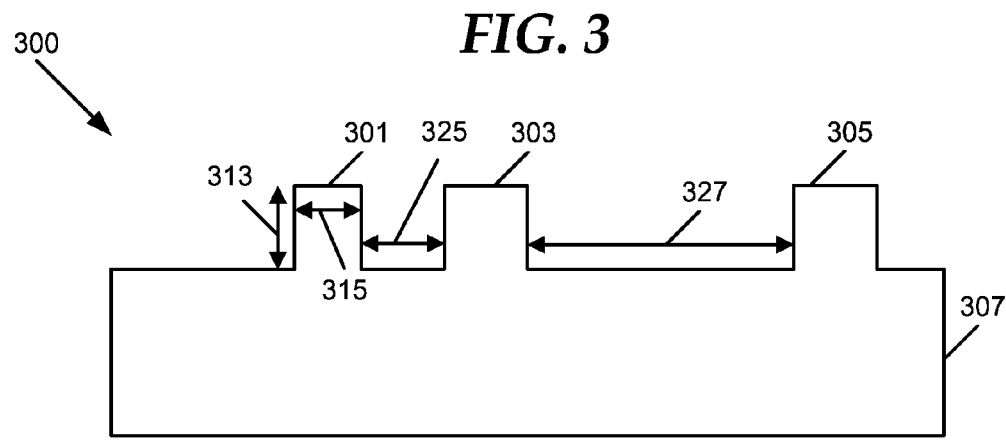
Figure 5:
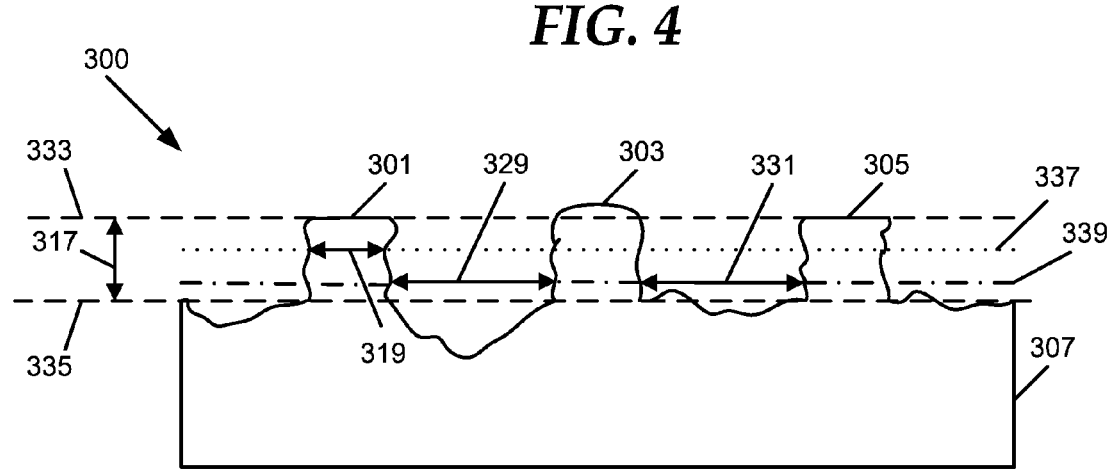

FIGS. 3, 4, and 5 include illustrations of a cross-sectional view of a scintillation crystal in accordance with particular embodiments. In particular, FIGS. 3, 4, and 5 include respective cross-sectional views of a scintillation crystal 300 that has features 301, 303, and 305 disposed along a side of the scintillation crystal 300. The features 301, 303, and 305 extend from a main body 307 of the scintillation crystal 300. Each of the features 301, 303, and 305 has one or more dimensions, such as a respective height and a respective width. In an embodiment, the width may include a diameter. The features 301, 303, and 305 can also have a respective length that is not shown. In an embodiment, the dimensions of one or more of the features 301, 303, and 305 can be substantially the same. For example, the height, width, length, or any combination thereof, of one or more of the features 301, 303, and 305 can be substantially the same. In another embodiment, the dimensions of one or more of the features 301, 303, and 305 can be different. In a particular embodiment, the scintillation crystal 300 can be the scintillation crystal 113 of FIG. 1, the scintillation crystal 201 of FIG. 2, or another scintillation crystal.

In the illustrative embodiment of FIG. 3, the features 301, 303, and 305 include a respective height 309 and a respective width 311. In an embodiment, the height 309 and the width 311 of one or more of the features 301, 303, and 305 are substantially the same. Additionally, in one embodiment, the depths of the trenches between the features 301, 303, and 305 can be substantially the same. In a particular embodiment, the depths of the trenches between the features 301, 303, and 305 can be substantially the same as one or more dimensions of the features 301, 303, and 305, such as the length, width, height, or any combination thereof, of the features 301, 303, and 305.

In the illustrative embodiment of FIG. 4, the features 301, 303, and 305 include a respective height 313 and a respective width 315. In an embodiment, the height 313 and the width 315 of one or more of the features 301, 303, and 305 can be different. For example, the height 313 of the feature 301 is different from the width 315 of the feature 301. In a particular embodiment, one or more of the respective widths of the features 301, 303, and 305 can be different. To illustrate, the width of the feature 301 can be different from the width of the feature 303.

In the illustrative embodiment of FIG. 5, the features 301, 303, and 305 include a respective height 317 and a respective width 319. Additionally, in the illustrative embodiment of FIG. 5, the features 301, 303, and 305 are irregularly shaped and the trenches between the features 301, 303, and 305 are also irregularly shaped. In a particular embodiment, the height, width, length, diameter, or any combination thereof, of one or more of the features 301, 303, and 305 can be different. In a further embodiment, the depths of the trenches between the features 301, 303, and 305 can be different from one or more of the dimensions of one or more of the features 301, 303, and 305, such as the length, width, height, or any combination thereof, of the features 301, 303 and 305.

The features 301, 303, and 305 are laterally surrounded by a space. Trenches between the features 301, 303, and 305 can be formed by the space surrounding the features 301, 303, and 305. The space can be defined, at least in part, by a respective distance between a feature and one or more additional features of the scintillation crystal 300 that are adjacent to the feature. In an embodiment, the respective distances between at least a portion of the features of the scintillation crystal 300 may be substantially the same. In another embodiment, the respective distances between at least a portion of the features of the scintillation crystal 300 may be different. In a further embodiment, the respective distances between at least a portion of the features of the scintillation crystal 300 can be substantially the same as one or more dimensions of features of the scintillation crystal 300. For example, the respective distances between some features can be substantially the same as the length, width, height, or any combination thereof, of the features.

In the illustrative embodiment of FIG. 3, the respective spaces surrounding the features 301, 303, and 305 can be defined at least partly by distance 321, distance 323, or both. In this embodiment, the distances 321 and 323 are substantially the same. In the illustrative embodiment of FIG. 4, the respective spaces surrounding the features 301, 303, and 305 can be defined at least partly by distance 325, distance 327, or both. In this embodiment, the distances 325 and 327 are different. Additionally, the distance 325 is substantially the same as the height 313 of the feature 303 and the width 315 of the feature 303. Although the distances 321 and 323 are substantially the same in FIG. 3 and the distances 325 and 327 are different in FIG. 4, other distances associated with one or more of the features 301, 303, and 305 can be the same or different from the distances 321, 323, 325, or 327. For example, in FIGS. 3 and 4, a distance between the feature 303 and an additional feature (not shown) that is adjacent to the feature 303 and disposed behind the feature 303 or disposed diagonal to the feature 303 can be different from the distances 321, 323, 325, or 327. In the illustrative embodiment of FIG. 5, the respective spaces surrounding the features 301, 303, and 305 can be defined at least partly by distance 329, distance 331, or both. In one embodiment, the distances 329 and 331 can be substantially the same, while in another embodiment, the distances 329 and 331 can be different.

Distances between the features 301, 303, and 305 can be measured along a common plane. Additionally, other dimensions of the features 301, 303, and 305, such as length, width, or any combination thereof, can be measured along one or more respective common planes. Further, heights of the features 301, 303, and 305 can be measured as a distance between two planes. For example, in the illustrative embodiment of FIG. 5, the height of the features 301, 303, and 305 can be measured as the distance between a first plane 333 and a second plane 335. Additionally, in the illustrative example of FIG. 5, the width of the features 301, 303, and 305 can be measured along a plane representative of the widths of the features 301, 303, and 305, such as plane 337, and the distances between the features 301, 303, and 305 can be measured along a plane representative of the distances between the features 301, 303, and 305, such as plane 339. Although different planes are shown in FIG. 5 for measuring the height of the features 301, 303, and 305; the width of the features 301, 303, and 305, and the distances between the features 301, 303, and 305, one or more of the dimensions can be measured along the same plane.

In an embodiment, dimensions of the features 301, 303, and 305 may be no greater than approximately 2.5 times the wavelength of scintillating light of the scintillation crystal 300. In addition, the distances between the features 301, 303, and 305, such as one or more of the distances 321, 323, 325, 327, 329, and 331, may be no greater than approximately 2.5 times the wavelength of the scintillating light of the scintillation crystal 300. In a particular embodiment, one or dimensions of the features 301, 303, and 305, the distances between the features 301, 303, and 305, or both, can be approximately 0.25 to 0.75 times the wavelength of the scintillating light or approximately 1.25 to 1.75 times the wavelength of the scintillating light. In another embodiment, dimensions of the features 301, 303, and 305, distances between the features 301, 303, and 305, or any combination thereof, may be no greater than approximately 1200 nm, no greater than approximately 900 nm, or no greater than approximately 300 nm. In an additional embodiment, the dimensions of the features 301, 303, and 305, distances between the features 301, 303, and 305, or any combination thereof, can at least approximately 110 nm, at least approximately 150 nm, or at least approximately 200 nm.

Figure 6:
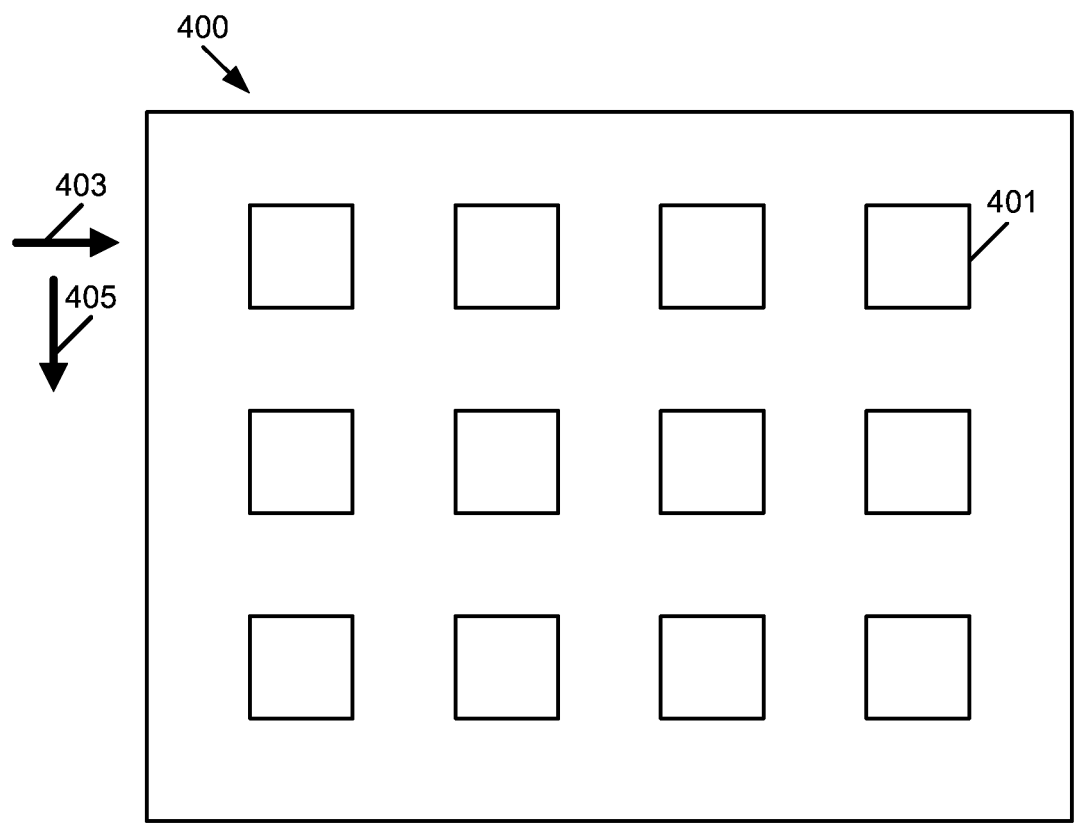
FIGS. 6 and 7 include illustrations of a top view of scintillation crystals in accordance with particular embodiments.
Figure 7:
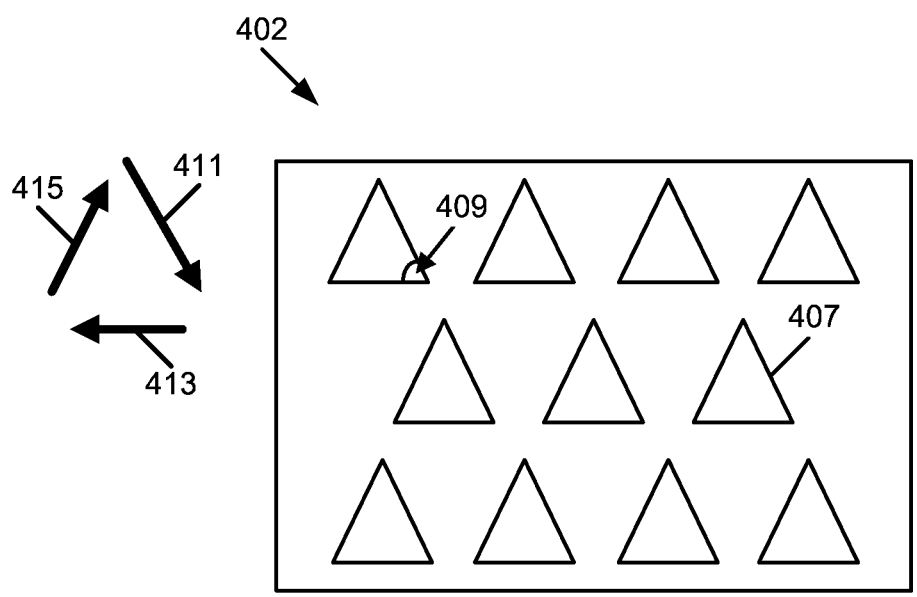

FIGS. 6 and 7 include illustrations of a top view of scintillation crystals 400 and 402 in accordance with particular embodiments. In the illustrative embodiment of FIG. 6, the scintillation crystal 400 includes a number of features 401 disposed along a side of the scintillation crystal 400. The features 401 are square-shaped and arranged in a regular pattern, such as a grid. Arranging the features 401 into a regular pattern can increase the number of photons exiting the scintillation crystal 400 in a particular period of time due to diffraction in comparison with a scintillation crystal having features 401 that are not arranged in a regular pattern. In an embodiment, dimensions of the features 401, such as height, width, length, or any combination thereof, can be substantially the same. In another embodiment, dimensions of the features 401 can be different. Additionally, the spacing between the features 401 can be the same in a particular embodiment and different in another embodiment. Further, in an embodiment, the spacing between the features 401 can be substantially the same as one or more dimensions of the features 401. In a particular embodiment, the dimensions of the features 401, the spacing between the features 401, or both, correspond to the wavelength of scintillating light of the scintillation crystal 400. In this embodiment, the number of photons exiting the scintillation crystal 400 due to diffraction may increase with respect to a scintillation crystal that does not have features, spacing between features, or both, that correspond to the wavelength of scintillating light of the scintillation crystal.

In an illustrative embodiment, the arrangement of the features 401 of the scintillation crystal 400 can be formed by applying an abrasive material in a first direction 403 and then applying the abrasive material in a second direction 405 that is orthogonal to the first direction 403. In a particular embodiment, the abrasive material may be applied once in the first direction 403 and once in the second direction 405. The arrangement of the features 401 can also be formed by a lithographic process, laser ablation, a liquid jet, or any combination thereof.

In the illustrative embodiment of FIG. 7, the scintillation crystal 402 includes a number of features 407 disposed along a side of the scintillation crystal 402. The features 407 are triangle shaped and have one or more angles, such as angle 409. In an embodiment, the features 407 can be equilateral triangles. In another embodiment, the features 407 can be isosceles triangles. In a particular embodiment, dimensions of the features 407, such as base, height, hypotenuse, or any combination thereof, can be substantially the same. In an additional embodiment, dimensions of the features 407 can be different. In an illustrative embodiment, the arrangement of the features 407 can be formed by applying an abrasive material in a first direction 411, then applying the abrasive material in a second direction 413, and subsequently applying the abrasive material in a third direction 415. In an embodiment, the first direction 411, the second direction 413, and the third direction 415 can be offset from each other by 60. In a further embodiment, the abrasive material may be applied once in the first direction 411, once in the second direction 413, and once in the third direction 415. The arrangement of the features 407 can also be formed by a lithographic process, laser ablation, a liquid jet, or any combination thereof.

Although FIG. 6 illustrates the scintillation crystal 400 having features with square shapes and FIG. 7 illustrates the scintillation crystal 402 having features with triangle shapes, scintillation crystals described herein can also include features having other shapes. For example, a scintillation crystal can include features disposed along a side having the shape of a rectangle, a rhombus, a parallelogram, a cylinder, or any combination thereof. Features of scintillation crystals described herein can also include features with a combination of different shapes. Additionally, in FIGS. 6 and 7, the shapes of the features are identified when viewing the features from a top view, in other embodiments, the shapes of the features of a scintillation crystal can be identified when viewing the features from a cross-sectional view, from a perspective view, from another view, or any combination thereof. In an embodiment, the shapes and the arrangement of the features can depend, at least in part, on the direction of application of an abrasive material to the surface of a scintillation crystal, the number of applications of the abrasive material in different directions along the surface of the scintillation crystal, or any combination thereof. In an additional embodiment, the shapes and arrangement of the features can depend, at least in part, on an arrangement of particles of the abrasive material, a shape of particular of the abrasive material, or any combination thereof. For example, an abrasive material having particles arranged in an irregular pattern can produce features on a side of a scintillation crystal in an irregular pattern, while in another embodiment an abrasive material having particles arranged in a regular pattern can produce features arranged on the side of a scintillation crystal in a regular pattern. In a further embodiment, an abrasive material having particles with a conical shape can produce features having substantially rounded top sides, while an abrasive material having particles with a cube shape can produce features having substantially flat top surfaces.

In another embodiment, a scintillation crystal with features formed along a side can be used in a pixelated array of scintillation crystals. For example, one or more of the scintillation crystals 113, 201, 300, 400, and 402, can each be one scintillation pixel of a plurality of scintillation pixels of a radiation detection apparatus. Thus, in a particular embodiment, pixels of a scintillator array can include features formed along particular sides of the respective pixels, where the features extend from the main bodies of the pixels. In addition, the features can have substantially the same composition as the main bodies of the pixels and the pixels can be substantially interface free between the features of the pixels and the main bodies. In a further embodiment, the features of the pixels can have a dimension that is no greater than approximately 2.5 times a wavelength of the scintillating light. In still another embodiment, a plurality of scintillation pixels can be formed from one or more of the scintillation crystals 113, 201, 300, 400, and 402.

Embodiments may be in accordance with any one or more of the items as listed below.

Item 1. A scintillation crystal capable of emitting scintillating light, comprising:
a main body;
a feature extending from the main body along a side of the scintillation crystal, wherein:
the feature has a dimension that is no greater than approximately 2.5 times a wavelength of the scintillating light;
the feature and the main body have substantially a same composition; and
the scintillation crystal is interface free between the feature and the main body.

Item 2. A radiation detection apparatus comprising:
a scintillation crystal capable of emitting scintillation light, comprising:
a main body;
a feature extending from the main body along a side of the scintillation crystal, wherein:
the feature has a dimension that is no greater than approximately 2.5 times a wavelength of the scintillating light;
the feature and the main body have substantially a same composition; and
the scintillation crystal is interface free between the feature and the main body; and
a photosensor to receive the scintillating light from the scintillation crystal.

Item 3. The radiation detection apparatus as recited in Item 2, further comprising an optical coupling material disposed between the side of the scintillation crystal and the photosensor.

Item 4. The radiation detection apparatus as recited in Item 3, wherein the optical coupling material directly contacts the feature and the main body.

Item 5. The radiation detection apparatus as recited in Item 4, wherein the optical coupling material is substantially void free between the photosensor and the scintillation crystal.

Item 6. The radiation detection apparatus as recited in Item 4, wherein substantially all exposed surfaces of the feature are in direct contact with the optical coupling material.

Item 7. The radiation detection apparatus as recited in Item 3, wherein the optical coupling material comprises an organic polymer.

Item 8. The radiation detection apparatus as recited in Item 7, wherein the organic polymer includes a silicone rubber, an epoxy, or any combination thereof.

Item 9. The radiation detection apparatus as recited in Item 3, further comprising a window disposed between the optical coupling material and the photosensor.

Item 10. The radiation detection apparatus as recited in Item 9, wherein the window comprises quartz or sapphire.

Item 11. The radiation detection apparatus as recited in any one of Items 2 to 10, wherein the photosensor comprises a photodiode, a photomultiplier tube, a silicon photomultiplier, an avalanche photodiode, a hybrid photomultiplier tube, or any combination thereof.

Item 12. The radiation detection apparatus as recited in any one of Items 2 to 11, further comprising a reflector disposed along a different side of the scintillation crystal.

Item 13. The radiation detection apparatus as recited in any one of Items 2 to 12, wherein the side of the scintillation crystal faces the photosensor.

Item 14. The radiation detection apparatus as recited in any one of Items 2 to 13, wherein the radiation detection apparatus comprises a medical imaging apparatus, a well logging apparatus, or a security inspection apparatus.

Item 15. The radiation detection apparatus as recited in any one of Items 2 to 14, wherein the scintillation crystal is one scintillation pixel of a plurality of scintillation pixels.

Item 16. The radiation detection apparatus as recited in Item 15, wherein at least an additional scintillation pixel of the plurality of scintillation pixels has a respective main body and a respective feature extending from the respective main body along a side of the additional scintillation pixel, wherein:
the respective feature has a dimension that is no greater than approximately 2.5 times a wavelength of the scintillating light;
the respective feature and the respective main body have substantially a same composition; and
the additional scintillation pixel is interface free between the respective feature and the respective main body.

Item 17. The scintillation crystal or the radiation detection apparatus as recited in any one of Items 2 to 14, wherein the scintillation crystal includes a plurality of scintillation pixels.

Item 18. The scintillation crystal or the radiation detection apparatus as recited in any of the preceding Items, wherein the feature is formed along the side of the scintillation crystal by removing portions of the main body of the scintillation crystal.

Item 19. A process comprising:
removing portions of a scintillation crystal along a side of the scintillation crystal to form a feature extending from a main body of the scintillation crystal and disposed along the side of the scintillation crystal, wherein the feature has a dimension no greater than approximately 2.5 times a wavelength of scintillating light of the scintillation crystal.

Item 20. The process as recited in Item 19, wherein the portions of the scintillation crystal are removed via a lapping process, lithography, an ion beam, an electron beam, a liquid jet, or any combination thereof.

Item 21. The scintillation crystal, the radiation detection apparatus, or the process as recited in any one of Items 1 to 20, wherein the scintillation crystal further comprises additional features extending from the main body along the side of the scintillation crystal.

Item 22. The scintillation crystal, the radiation detection apparatus, or the process as recited in Item 21, wherein the feature and the additional features are arranged in a pattern.

Item 23. The scintillation crystal, the radiation detection apparatus, or the process as recited in Item 22, wherein the pattern is a regular pattern.

Item 24. The scintillation crystal, the radiation detection apparatus, or the process as recited in Item 23, wherein the regular pattern is a grid.

Item 25. The scintillation crystal, the radiation detection apparatus, or the process as recited in any one of the preceding Items, wherein, from a top view, the feature has a shape including a square, a rhombus, a parallelogram, a triangle, a cylinder, or any combination thereof.

Item 26. The scintillation crystal, the radiation detection apparatus, or the process as recited in any one of the preceding Items, wherein the dimension includes length, width, height, radius, diameter, or any combination thereof.

Item 27. The scintillation crystal, the radiation detection apparatus, or the process as recited in any one of the preceding Items, wherein a height of the feature is no greater than approximately 1500 nm, no greater than approximately 1200 nm, no greater than approximately 900 nm, no greater than approximately 700 nm, or no greater than approximately 300 nm.

Item 28. The scintillation crystal, the radiation detection apparatus, or the process as recited in any one of the preceding Items, wherein a height of the feature is no less than approximately 110 nm, no less than approximately 150 nm, or no less than approximately 200 nm.

Item 29. The scintillation crystal, the radiation detection apparatus, or the process as recited in any one of the preceding Items, wherein the dimension is approximately 0.25 to 0.75 times the wavelength of the scintillating light or approximately 1.25 to 1.75 times the wavelength of the scintillating light.

Item 30. The scintillation crystal, the radiation detection apparatus, or the process as recited in any one of the preceding Items, wherein the wavelength of the scintillating light is in a range of approximately 250 nm to approximately 600 nm.

Item 31. The scintillation crystal, the radiation detection apparatus, or the process as recited in any one of the preceding Items, wherein no greater than approximately 45% of the photons of the scintillating light exit the scintillation crystal in the absence of a reflector adjacent to a plurality of additional sides of the scintillation crystal.

Item 32. The scintillation crystal, the radiation detection apparatus, or the process as recited in any one of the preceding Items, wherein no less than approximately 22% of the photons of the scintillating light exit the scintillator crystal in the absence of a reflector adjacent to a plurality of additional sides of the scintillation crystal.

Item 33. The scintillation crystal, the radiation detection apparatus, or the process as recited in any one of Items 1 to 30, wherein greater than approximately 92% of the photons of the scintillating light exit the scintillation crystal when one or more additional sides of the scintillation crystal are adjacent to a reflector.

Item 34. The scintillation crystal, the radiation detection apparatus, or the process as recited in any one of the preceding Items, wherein the feature is laterally surrounded by a space.

Item 35. The scintillation crystal, the radiation detection apparatus, or the process as recited in Item 34, wherein the space is defined, at least in part, by a respective distance between a surface of the feature and a surface of each of one or more additional features of the scintillation crystal that are adjacent to the feature.

Item 36. The scintillation crystal, the radiation detection apparatus, or the process as recited in claim 35, wherein the respective distance is no greater than approximately 2.5 times the wavelength of the scintillating light of the scintillation crystal.

Item 37. The scintillation crystal, the radiation detection apparatus, or the process as recited in claim 35 or 36, wherein the respective distance is substantially the same as the dimension of the feature.

Item 38. The scintillation crystal, the radiation detection apparatus, or the process as recited in Item 35, wherein the respective distance between the surface of the feature and the surface of each of the one or more additional features is substantially the same.

Item 39. The scintillation crystal, the radiation detection apparatus, or the process as recited in Item 35, wherein the respective distance between the surface of the feature and the surface of each of the one or more additional features is different.

Item 40. The scintillation crystal, radiation detection apparatus, or the process as recited in any of the preceding Items, wherein the feature and the main body are monolithic.

Item 41. The scintillation crystal, radiation detection apparatus, or the process as recited in any of the preceding Items, wherein a top surface of the feature and a top surface of a number of additional features along the side of the scintillation crystal are disposed substantially along a cleavage plane of the scintillation crystal.

Item 42. A process comprising:
abrading a scintillation crystal via a single application of an abrasive material to at least one surface of the scintillation crystal.

Item 43. The process as recited in Item 42, wherein the abrasive material includes diamond particles, alumina particles, silicon carbide particles, or any combination thereof.

Item 44. The process as recited in Item 42 or 43, wherein the abrasive material includes particles having dimensions no greater than approximately 900 nm, no greater than approximately 700 nm, or no greater than approximately 500 nm.

Item 45. The process as recited in any one of Items 42 to 44, wherein the abrasive material includes particles having dimensions no less than approximately 110 nm, no less than approximately 200 nm, or no less than approximately 250 nm.

Item 46. The process as recited in any one of Items 42 to 45, wherein the single application of the abrasive material is a first application of the abrasive material, and the process further comprises abrading the scintillation crystal via a second application of the abrasive material in a direction different from a direction of the first application.

Item 47. The process as recited in Item 46, wherein the second application of the abrasive material is in a direction approximately orthogonal to the direction of the first application.

Item 48. The process as recited in Item 46, wherein the single application of the abrasive material is a first application of the abrasive material, and the process further comprises:
abrading the scintillation crystal via a second application of the abrasive material in a direction offset by approximately 60 degrees from a direction of the first application; and
abrading the scintillation crystal via a third application of the abrasive material in a direction offset by approximately 60 degrees from the direction of the second application.

Item 49. The process as recited in any one of Items 42 to 48, wherein the abrasive material is applied to the scintillation crystal by hand, by a machine, or both.

Item 50. The process of any one of Items 42 to 49, wherein the scintillation crystal is abraded by a lapping process.

Item 51. The process as recited in any one of Items 42 to 50, wherein the scintillation crystal is cleaved along a cleavage plane.

Item 52. The process as recited in Item 51, wherein a cleaved surface of the scintillation crystal is substantially planar.

Item 53. The process as recited in Item 51 or 52, wherein the scintillation crystal is cleaved before abrading the scintillation crystal.

Item 54. The scintillation crystal, the radiation detection apparatus, or the process as recited in any one of the preceding Items, wherein a first portion of photons of the scintillating light exit the scintillation crystal due to diffraction and a second portion of the photons of the scintillating light exit the scintillation crystal due to transmission.

Item 55. The scintillation crystal, the radiation detection apparatus, or the process as recited in any one of the preceding Items, wherein the scintillation crystal comprises NaI(Tl), CsI(Tl or Na), LaBr$_3$(Ce), CeBr$_3$, SrI$_2$(Eu), LuSiO$_5$(Y and/or Ce), Cs$_2$LiYCl$_6$(Ce), or those scintillators in the following classes: alkali halide scintillators, alkaline halide scintillators, lanthanide halide scintillators, or elpasolite scintillators Item 56. A positron emission tomography apparatus comprising the radiation detection apparatus of any one of Items 2 to 18.

Item 57. A laser device comprising the scintillation crystal made by the process of or the scintillation crystal of any one of Items 1 or 19 to 55.

Item 58. An optical data storage device comprising the scintillation crystal made by the process of or the scintillation crystal of any one of Items 1 or 19 to 55.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection apparatus comprising:
a scintillation crystal capable of emitting scintillating light, comprising:
a main body;
a feature extending from the main body along a side of the scintillation crystal, wherein:
the feature has a dimension that is no greater than approximately 2.5 times a wavelength of the scintillating light;
the feature and the main body have substantially a same composition; and
the scintillation crystal is interface free between the feature and the main body; and
a photosensor to receive the scintillating light exiting the side of the scintillation crystal.

2. A radiation detection apparatus comprising:
a scintillation crystal capable of emitting scintillation light, comprising:
a main body;
a first feature extending from the main body along a side of the scintillation crystal, wherein:
the first feature has a dimension that is no greater than approximately 2.5 times a wavelength of the scintillating light;
the first feature and the main body have substantially a same composition; and
the scintillation crystal is interface free between the first feature and the main body; and
a photosensor to receive the scintillating light from the scintillation crystal, wherein the photosensor is optically coupled to the side of the scintillation crystal.

3. The radiation detection apparatus as recited in claim 2, wherein the scintillation crystal further comprises a second feature extending from the main body along the side of the scintillation crystal, wherein:
the second feature has a dimension that is no greater than approximately 2.5 times a wavelength of the scintillating light;
the second feature and the main body have substantially a same composition;
the scintillation crystal is interface free between the second feature and the main body; and
the first feature and the second feature is separated by a trench along the side of the scintillation crystal.

4. The radiation detection apparatus as recited in claim 3, further comprising an optical coupling material disposed between the side of the scintillation crystal and the photosensor and in the trench separating the first feature and the second feature.

5. The radiation detection apparatus as recited in claim 1, wherein the photosensor is coupled to the side of the scintillation crystal by an optical coupling material.

6. The radiation detection apparatus as recited in claim 4, further comprising a window disposed between the optical coupling material and the photosensor.

7. The radiation detection apparatus as recited in claim 1, wherein the dimension comprises a width of the feature.

8. The radiation detection apparatus as recited in claim 2, wherein the photosensor comprises a photodiode, a photomultiplier tube, a silicon photomultiplier, an avalanche photodiode, a hybrid photomultiplier tube, or any combination thereof.

9. The radiation detection apparatus as recited in claim 2, further comprising a reflector disposed along a different side of the scintillation crystal.

10. The radiation detection apparatus as recited in claim 1, wherein the radiation detection apparatus comprises a medical imaging apparatus, a well logging apparatus, or a security inspection apparatus.

11. The radiation detection apparatus as recited in claim 1, wherein the scintillation crystal is one scintillation pixel of a plurality of scintillation pixels and wherein at least an additional scintillation pixel of the plurality of scintillation pixels has a respective main body and a respective feature extending from the respective main body along a side of the additional scintillation pixel, wherein:
the respective feature has a dimension that is no greater than approximately 2.5 times a wavelength of the scintillating light;
the respective feature and the respective main body have substantially a same composition; and the additional scintillation pixel is interface free between the respective feature and the respective main body.

12. The radiation detection apparatus as recited in claim 2, wherein the dimension comprises a width of the feature.

13. The radiation detection apparatus as recited in claim 2, wherein the feature is formed along the side of the scintillation crystal by removing portions of the main body of the scintillation crystal.

14. A process comprising:
removing portions of a scintillation crystal along a side of the scintillation crystal to form a feature extending from a main body of the scintillation crystal and disposed along the side of the scintillation crystal, wherein the feature has a dimension no greater than approximately 2.5 times a wavelength of scintillating light of the scintillation crystal, wherein removing is performed by abrading the side of the scintillation crystal via an application of an abrasive material.

15. The process as recited in claim 14, further comprising cleaving the scintillation crystal along a cleavage plane of the scintillation crystal to form the side of the scintillation crystal.

16. The process as recited in claim 14, in which removing portions of a scintillation crystal along a side of the scintillation crystal to form a feature extending from a main body of the scintillation crystal and disposed along the side of the scintillation crystal comprises removing portions of a scintillation crystal along a side of the scintillation crystal to form a plurality of features extending from a main body of the scintillation crystal and disposed along the side of the scintillation crystal and arranged in a regular pattern.

17. The process as recited in claim 16, wherein the regular pattern is a grid.

18. The process as recited in claim 14, wherein, from a top view, the feature has a shape including a square, a rhombus, a parallelogram, a triangle, a cylinder, or any combination thereof.

19. The process as recited in claim 14, wherein the dimension is approximately 0.25 to 0.75 times the wavelength of the scintillating light or approximately 1.25 to 1.75 times the wavelength of the scintillating light.

20. The process as recited in claim 14, wherein abrading comprises a single application of an abrasive material to the side of the scintillation crystal along a first direction.

21. The process as recited in claim 14, wherein the abrasive material includes diamond particles, alumina particles, silicon carbide particles, or any combination thereof.

22. The process as recited in claim 20, wherein the single application of the abrasive material is a first application of the abrasive material, and the process further comprises abrading the scintillation crystal via a second application of the abrasive material in a second direction different from the first direction of the first application.

23. The process as recited in claim 22, wherein the second application of the abrasive material is in a direction approximately orthogonal to the direction of the first application.

24. The process as recited in claim 14, wherein the application of the abrasive material is a first application of the abrasive material, and the process further comprises:
abrading the scintillation crystal via a second application of the abrasive material in a direction offset by approximately 60 degrees from a direction of the first application; and
abrading the scintillation crystal via a third application of the abrasive material in a direction offset by approximately 60 degrees from the direction of the second application.

* * * * *